United States Patent [19]

Sugar et al.

[11] Patent Number: 5,329,807
[45] Date of Patent: Jul. 19, 1994

[54] CENTRIFUGE TEST APPARATUS FOR FOOTWEAR AND APPAREL

[75] Inventors: Thomas G. Sugar, Newark; Seshamamba Yalamanchili, New Castle, both of Del.

[73] Assignee: W. L. Gore & Associates, Inc., Newark, Del.

[21] Appl. No.: 80,024

[22] Filed: Jun. 18, 1993

[51] Int. Cl.⁵ .............................................. G01M 3/04
[52] U.S. Cl. ........................................ 73/40; 73/38
[58] Field of Search ....................................... 73/40, 38

[56] References Cited

U.S. PATENT DOCUMENTS

| | | | |
|---|---|---|---|
| 4,776,209 | 10/1988 | Patchel | 73/45.5 |
| 4,799,384 | 1/1989 | Casali | 73/45.5 |
| 4,918,981 | 4/1990 | Gore | 73/38 X |
| 4,961,339 | 10/1990 | Kleis et al. | 73/73 |
| 5,073,482 | 12/1991 | Goldstein | 73/38 X |

FOREIGN PATENT DOCUMENTS

| | | | |
|---|---|---|---|
| 2643713 | 8/1990 | France | 73/40 |
| 1693416 | 11/1991 | U.S.S.R. | 73/40 |

Primary Examiner—Herzon E. Williams
Assistant Examiner—Joseph W. Roskos
Attorney, Agent, or Firm—Dena Meyer Weker

[57] ABSTRACT

This invention relates to a centrifugal apparatus for testing the waterproofness of an article of footwear. The centrifugal apparatus may also be used to test other apparel such as gloves, socks, waders, pants, and hats.

14 Claims, 10 Drawing Sheets

CENTRIFUGE TEST APPARATUS FOR FOOTWEAR AND APPAREL

FIELD OF THE INVENTION

This invention relates to a centrifugal apparatus for testing the waterproofness of an article of footwear. The centrifugal apparatus may also be used to test other apparel such as but not limited to gloves, socks, pants, waders, and hats.

BACKGROUND OF THE INVENTION

New and different shoe constructions have recently entered the marketplace that are waterproof yet do not possess the traditional waterproof bootie insert that previously provided the waterproofness to shoes and boots. Some of these boots and shoes having the bootie were often tested for leaks by using a bootie testing machine such as that described in U.S. Pat. No. 4,799,384 in which the footwear article was gripped by means for gripping such as inflatable gripper or clamps and injected with air so as to inflate the article. The article was then immersed in a tank of liquid (water) after which an inspection was made to determine if a stream of bubbles evolved indicating a leak. Some waterproof shoes however do not have a long enough upper so as to be gripped by this type of apparatus. Further, although the bootie testing machine is very useful in testing the bootie inserts, difficulties are encountered in testing the entire shoe or boot containing the booties as they are too bulky and thus do not facilitate the creation of a seal in order for the shoe to be tested. Also, in testing of some shoes and boots containing the booties and shoe inserts, testing often required that the inserts be removed from the shoe or boot for testing. As mentioned above, some of the new footwear articles now commercially available do not possess inserts.

With new footwear constructions not incorporating the bootie construction and for shoes that do not have a sufficient upper to be gripped, a new apparatus and test method for leak testing is needed.

Besides footwear, an assortment of waterproof apparel are entering into the marketplace at record speed. These items are said to be waterproof, however, many possess small leaks due to flaws and ruptures created during manufacturing.

These waterproof apparel are likewise tested by equipment and techniques which also fail to detect many of these small leaks. These techniques include a leak detector system wherein an article of clothing is placed within a chamber and water droplets are introduced at a specified velocity and drop size so as to simulate rain. The article is then visually inspected to determine if any water entered the inside surface. Alternatively, a series of sensors may be placed within the article to see if any water leaked through as described in U.S. Pat. No. 4,961,339.

Other methods include filling the article of clothing such as a glove with air and testing for gas leaks as described in U.S. Pat. No. 4,776,209. Alternatively, the article may be filled with water and with any openings closed off so that water is allowed to penetrate through any damaged or unsealed area due to hydrostatic forces. As can be imagined, many of these test methods require complicated and costly equipment or require a significant amount of time in order to determine if any leaks exist. Even with these test methods, a substantial number of leaks may still go undetected.

There is a need for a simple apparatus to test the waterproofness of a waterproofed article of clothing that is more expedient and is more effective in detecting microscopic leaks than the methods which presently exist.

SUMMARY OF THE INVENTION

A testing apparatus for detecting leaks in waterproof articles of footwear is provided. The apparatus comprises one or more hanging baskets capable of pivotly swinging outward and inward into which footwear articles to be tested are placed, a rotatable hub having a longitudinal axis around which the hanging baskets are positioned, a means for rotating the rotatable hub and a housing enclosure which contains the hub and hanging baskets. The apparatus operates and tests footwear leakages using the centripetal forces generated by spinning the footwear filled with water. An equal and opposite centrifugal force pressurizes water inside the footwear which is discharged if a leak is present.

A testing apparatus for detecting leaks in finished waterproof apparel is also provided. This apparatus comprises a plurality of clamping means holding the articles of clothing in place and wherein the clamping means with attached article are capable of pivotly swinging outward and inward, a rotatable hub having a longitudinal axis around which the clamping means are positioned, a means for rotating the rotatable hub and a housing enclosure which contains the hub and clamping means. Similar to the apparatus for testing shoes, one or more clamping means may be used. These clamping means are to support a non-free standing article. Closure means may also be provided to close off openings such as in trousers. This apparatus similar to that referred to above operates and tests for leaks in apparel such as but not limited to gloves, socks, pants, waders, and hats using the centripetal forces generated by spinning the article filled with water. An equal and opposite centrifugal force pressurizes water inside the garment or glove which is discharged if a leak is present.

DESCRIPTION OF THE PREFERRED EMBODIMENTS

An apparatus and a method for testing leaks in footwear articles are provided. Waterproof footwear articles include but are not limited to boots, shoes, slippers, and sneakers constructed of either waterproof materials or have a waterproof bootie that are inserted within the outer upper layer of the shoes to render them waterproof. Waterproof footwear articles may also include partially assembled footwear constructions in that the upper is constructed and has been rendered waterproof so as to have an insole or an incomplete construction may include a sole that is constructed and has extending sides but to which an upper has not yet been attached.

The centrifuge apparatus provided enables any waterproof footwear article as defined above to be tested for leaks. The apparatus tests footwear leakages using the centripetal forces generated on the shoe by spinning the footwear containing water. An equal and opposite centrifugal force pressurizes water inside the footwear which is discharged if a leak is present.

A detailed description of the invention is best understood with reference to the accompanying drawings.

Figure 1:
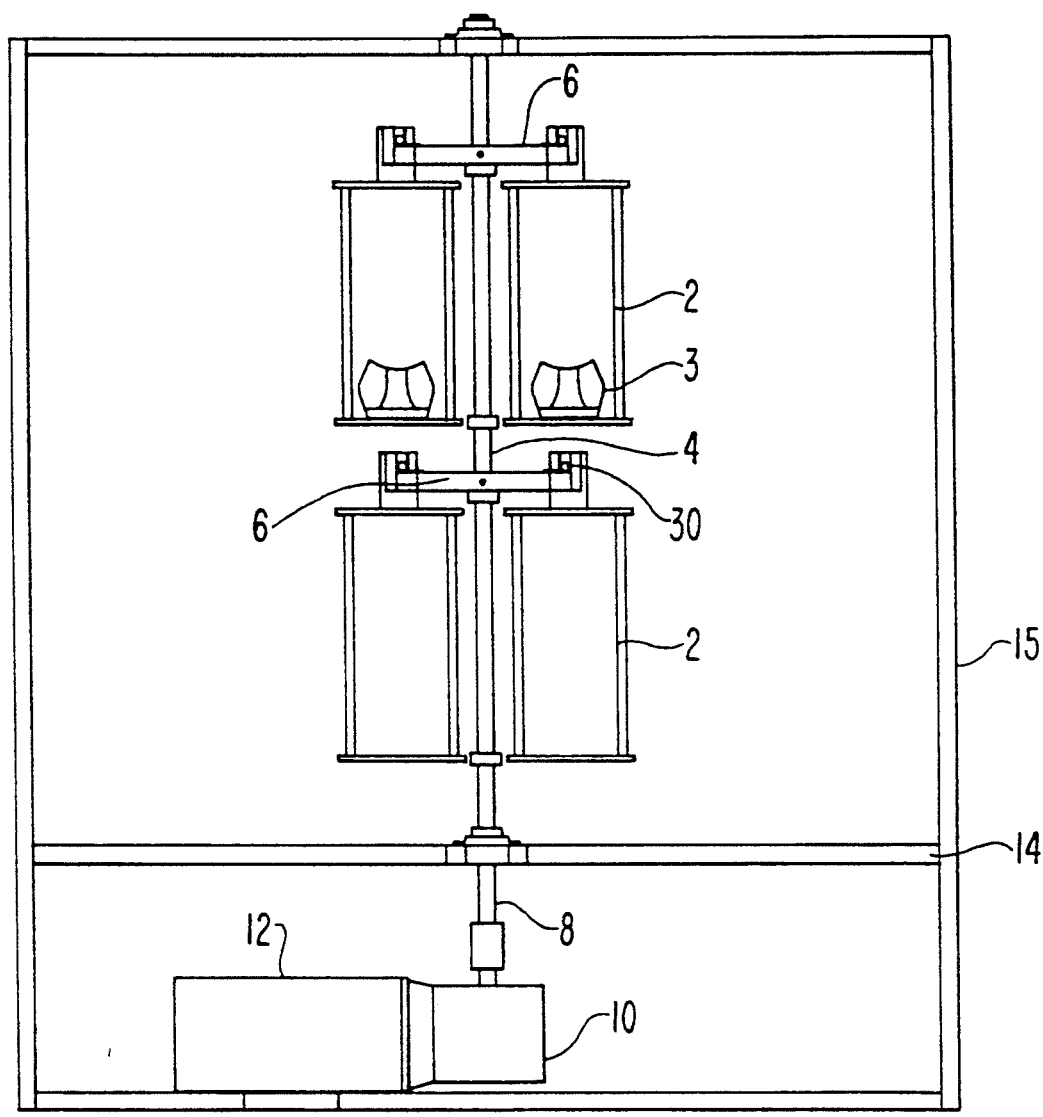
FIG. 1 is a front elevational view of the centrifuge testing apparatus for the testing of footwear.

FIG. 1 is a front elevational view of the centrifuge apparatus which includes a plurality of hanging baskets 2 into which a footwear article 3 is placed. Four hanging baskets are shown in FIG. 1 allowing for two pairs of shoes to be tested simultaneously. Although symmetry about the longitudinal axis of the hub 4 is preferred, an odd number of baskets including just one basket may be used although the apparatus will be slightly unbalanced and thus operate in a manner similar to that of an unbalanced washing machine. For apparatuses having an uneven number of baskets about the longitudinal axis or where footwear articles are used that are not of the same weight such that the weight about the axis is not balanced, the housing 14 enclosing the apparatus needs to be bolted to the floor or platform on which the apparatus is standing. In FIG. 1, the pair of baskets 2 are supported on a rotatable hub 4 by means of a cross bar 6 and are pivotly anchored on the cross bar by pin 30 so that when the hub rotates, the baskets are free to pivot outwards. Alternative means to support the baskets on the hub may also be used so long as the baskets are supported and the lower regions of the baskets are able to pivot outward and inward from the hub 4.

Figure 5:
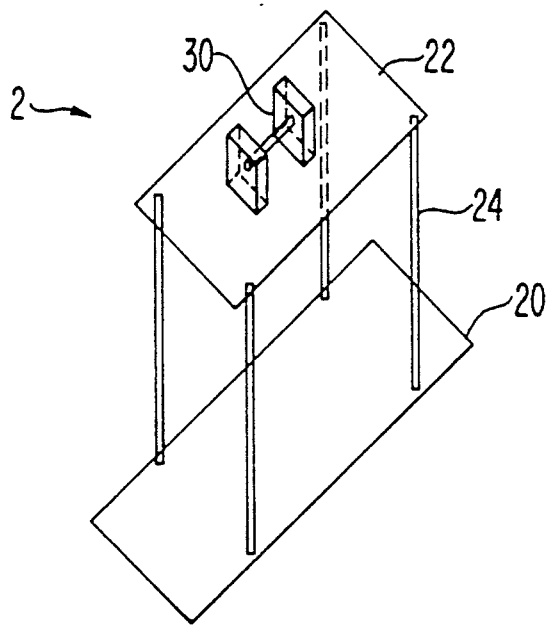
FIG. 5 is a perspective view of one of the baskets used in the apparatus used to test footwear articles.

Each basket 2 is designed to hold at least one footwear article 3 in an open enclosure which is capable of pivoting upon rotation. As shown in FIG. 5, a basket 2 may be constructed of a bottom platform plate 20 on which a footwear article is positioned, a top plate 22 parallel to the platform plate to which the cross bar 6 is attached. At each of the four corners of the top and bottom plate is a rod 24 that runs perpendicular to the two plates and connects them. Alternative basket constructions may also be used with this apparatus so long as the construction enables the footwear articles to be suspended in a pivotal manner about the hub 4.

The hub 4 is rigidly affixed to a drive shaft 8 and supported by a frame 14 which is part of a housing 15 enclosing the apparatus. The drive shaft 8 is connected to a gear box 10 which is attached to a motor 12. The motor 12 and gear box 10 operate to turn the drive shaft 8 so that it rotates a certain number of revolutions per minute. As the drive shaft 8 rotates, the rotatable hub 4 likewise rotates causing the baskets 2 to spin.

In operation, water is placed within the footwear article to an area above an expected leak point but below the top of the shoe or where a non-waterproof material is used. The amount of water (mass) used in the footwear article is directly proportional to the pressure created within the article.

Depending on the number of footwear articles desired to be tested, the procedure of filling the article to the desired level and placing the article within the basket is repeated. Although the preferred testing procedure provides for a balanced system such that an even number of baskets containing shoes of identical weight and containing equal amounts of water are positioned symmetrically about the rotatable hub, an unbalanced weight distribution of footwear articles may be used provided that the apparatus is bolted to the floor or platform so that movement of the apparatus (similar to that of an unbalanced washing machine) is prevented. To test the leakage of these footwear articles, the power is turned on causing the hub to rotate, the baskets to spin and pivot outwards and the water within the footwear articles to pressurize.

Figure 2:
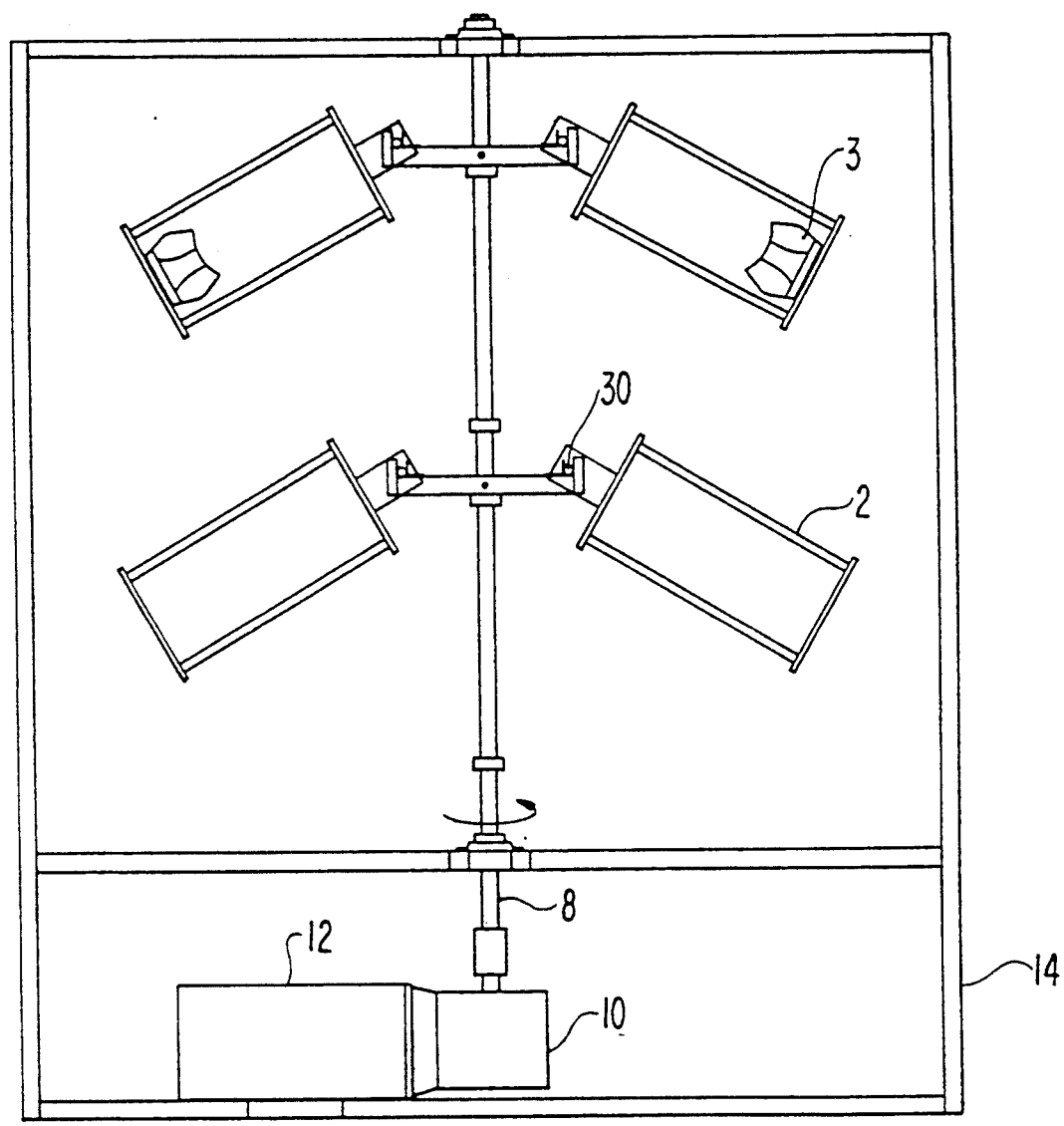
FIG. 2 is a front elevational view of the centrifuge testing apparatus at an intermediate stage in the test cycle.
Figure 3:
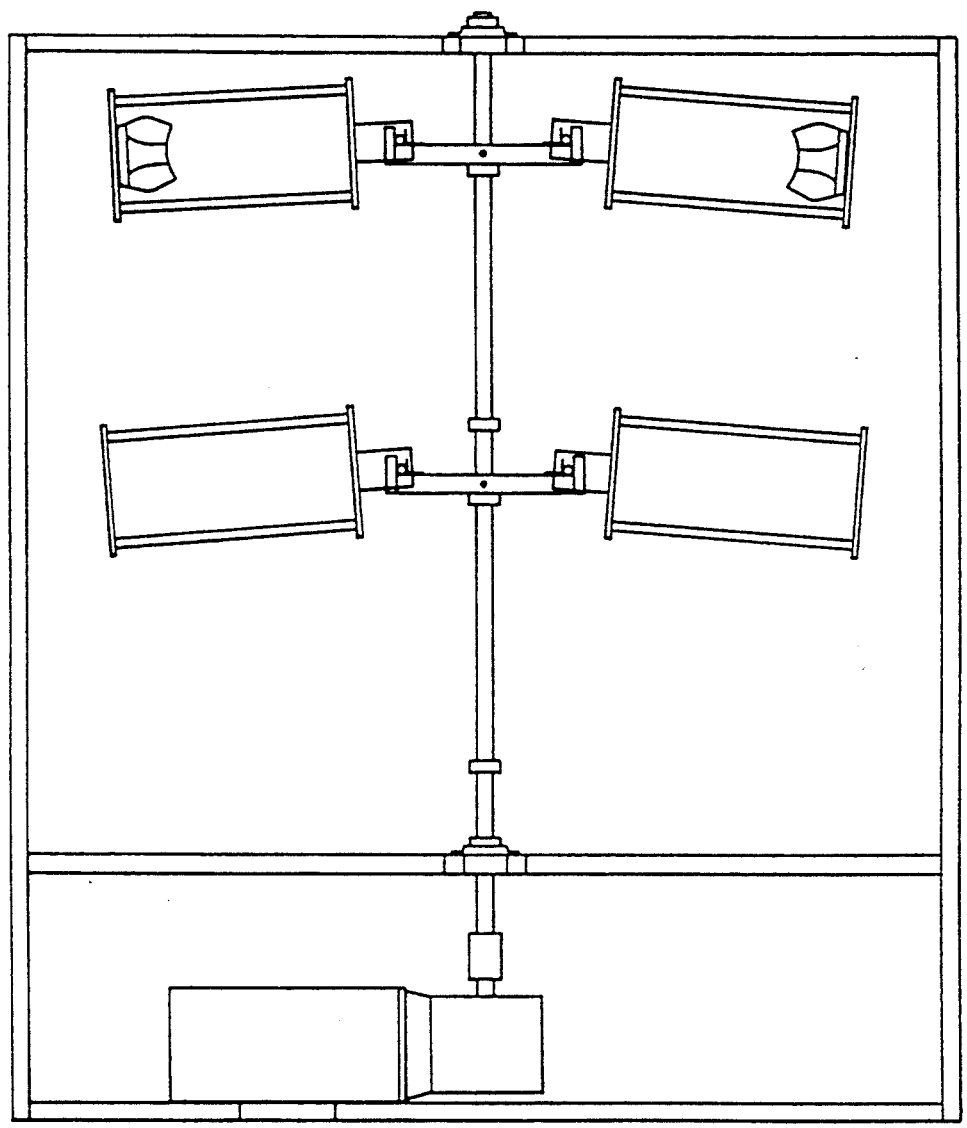
FIG. 3 is a front elevational view of the centrifuge testing apparatus at a final stage in the test cycle.
Figure 3A:
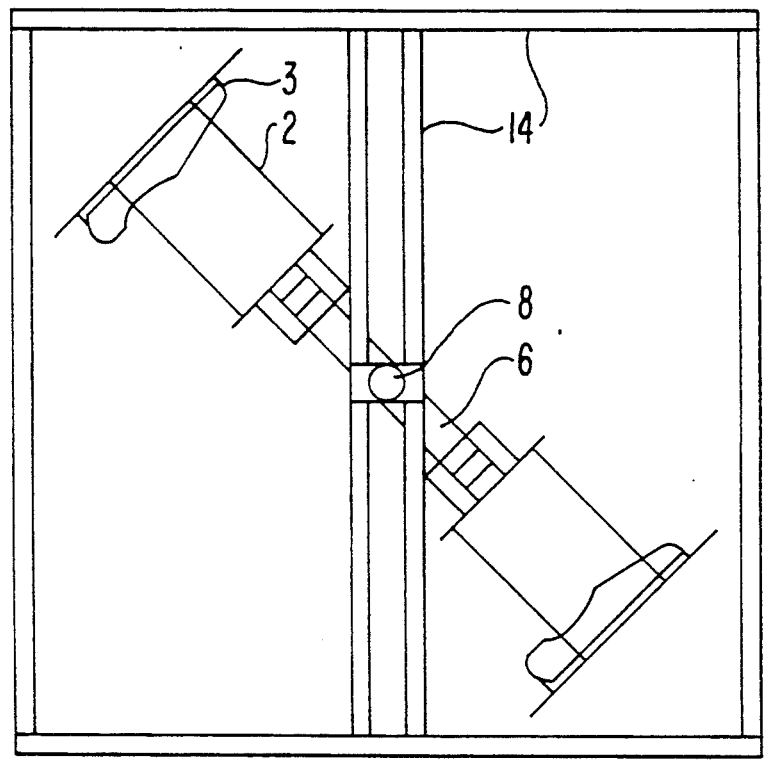
FIG. 3a is a top view of the centrifuge testing apparatus at its final stage.

FIG. 2 shows the apparatus at an intermediate phase wherein the baskets 2 pivotly swing outward as the hub 4 begins to spin. FIG. 3a is a top view of the centrifuge apparatus at the final stage. FIG. 3 shows the hub 4 rotating at a maximum speed causing the baskets 2 to pivot outward to the outermost position. The centripetal acceleration of the basket with water containing shoes causes the water to pressurize and discharge if a leak is present. Once the motor is turned off, the operator is able to visibly inspect the shoes to determine the approximate location of the leak and the possible cause of the leak. Water may bead outside on the surface of the outer upper or may penetrate the upper fabric so that the leaking area is damp and detectable.

Figure 4:
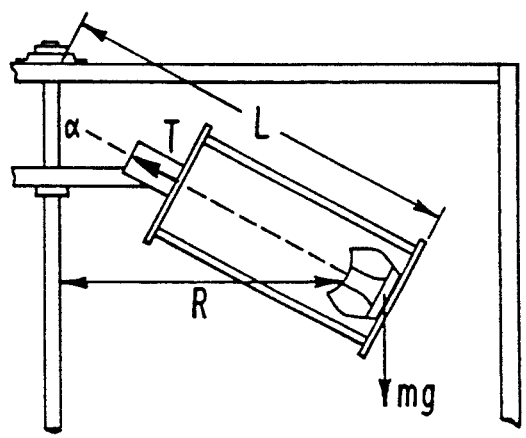
FIG. 4 is a schematic view of the forces generated during operation of the apparatus.

The principles of operation are in accordance with basic laws of physics wherein a force or tension having a horizontal and radial component are created by the mass of water contained in the article (footwear, glove or garment). The component forces are depicted in the schematic view shown in FIG. 4 and are characterized by the following equations.

$$T \cos\alpha = mg$$

$$T \sin\alpha = mv^2/R$$

$$V = Rw$$

$$T \sin\alpha = mw^2 R$$

wherein
- m = mass of the water contained in the article
- T = force due to the mass of the water
- R = radius of the circular path of the basket when it rotates
- v = tangential velocity
- w = angular velocity
- g = acceleration due to gravity α = angle created between the basket 6 and the rotatable hub 4

The angle α can be calculated based on the following relationships. Reference is again made to FIG. 4.

$$R = L \sin\alpha$$

$$T \sin\alpha = mw^2 L \sin\alpha$$

$$T = mw^2 L$$

$$T \cos\alpha = mw^2 L \cos\alpha = mg$$

$$\cos\alpha = g/(w^2 L)$$

wherein L = length of arm from center of mass to the pivoting point on the hub where α is created.

In general and as shown below in the example, pressures generated within the footwear article increase with depth into the shoe as a result of the increased mass. It has also been found through testing of many footwear articles that leaks can be found when a footwear article is tested in the centrifuge apparatus operating at 240 RPM within 1 to 30 minutes.

The speed and duration of the test is dependent on the size of the footwear article with the amount of water contained therein and whether the article is provided with additional padding or other upper layers (i.e. thickness and how tortuous the path through the upper layers through which the water must travel). Thus other leaks can be found at speeds lower than 240 RPM and can be tested for intervals less than 30 minutes.

Figure 6:
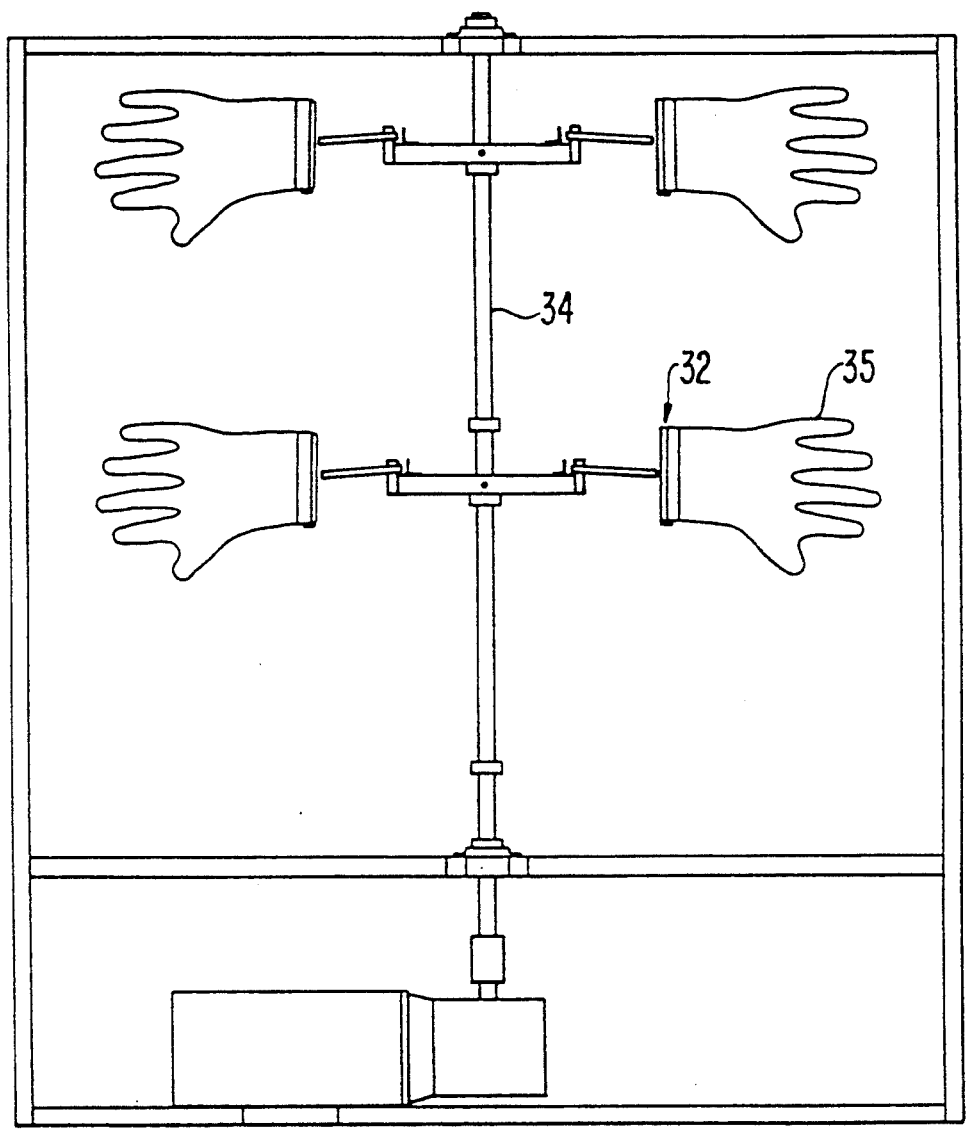
FIG. 6 is a front elevational view of the centrifuge testing apparatus for the testing of gloves.

Similar principles of physics apply to the situation of testing other articles of clothing such as but not limited to gloves, socks, pants, waders, and hats. The centrifuge apparatus includes similar components to those of the centrifuge apparatus used to test footwear articles. FIG. 6 is a front elevational view of the centrifuge apparatus which includes a plurality of clamping means 32 to which a glove or glove insert 35 is attached. Four clamping means 32 with gloves attached are shown connected to the rotatable hub 34.

Figure 6A:
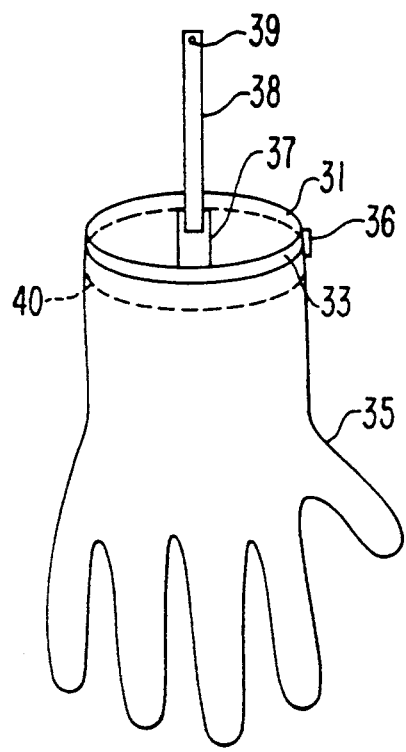
FIG. 6a is a perspective view of one of the clamping means used in the apparatus to test leaks in gloves.
Figure 6B:
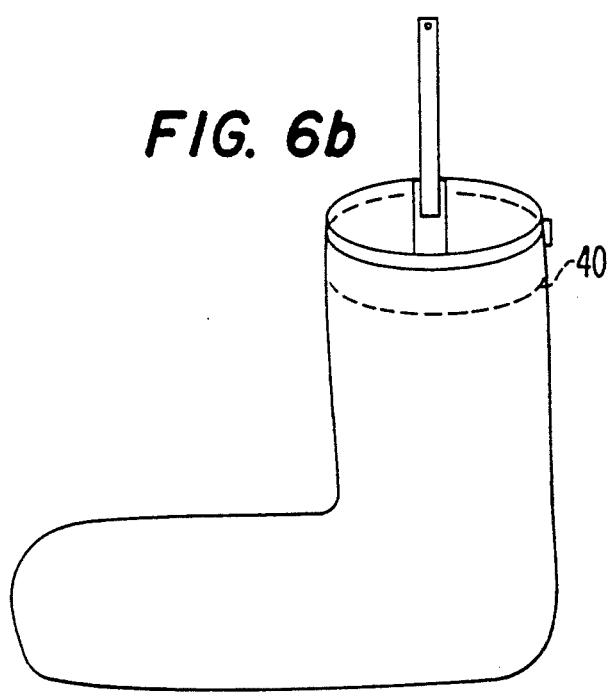
FIG. 6b is a perspective view of one of the clamping means used in the apparatus to test for leaks in socks.
Figure 6C:
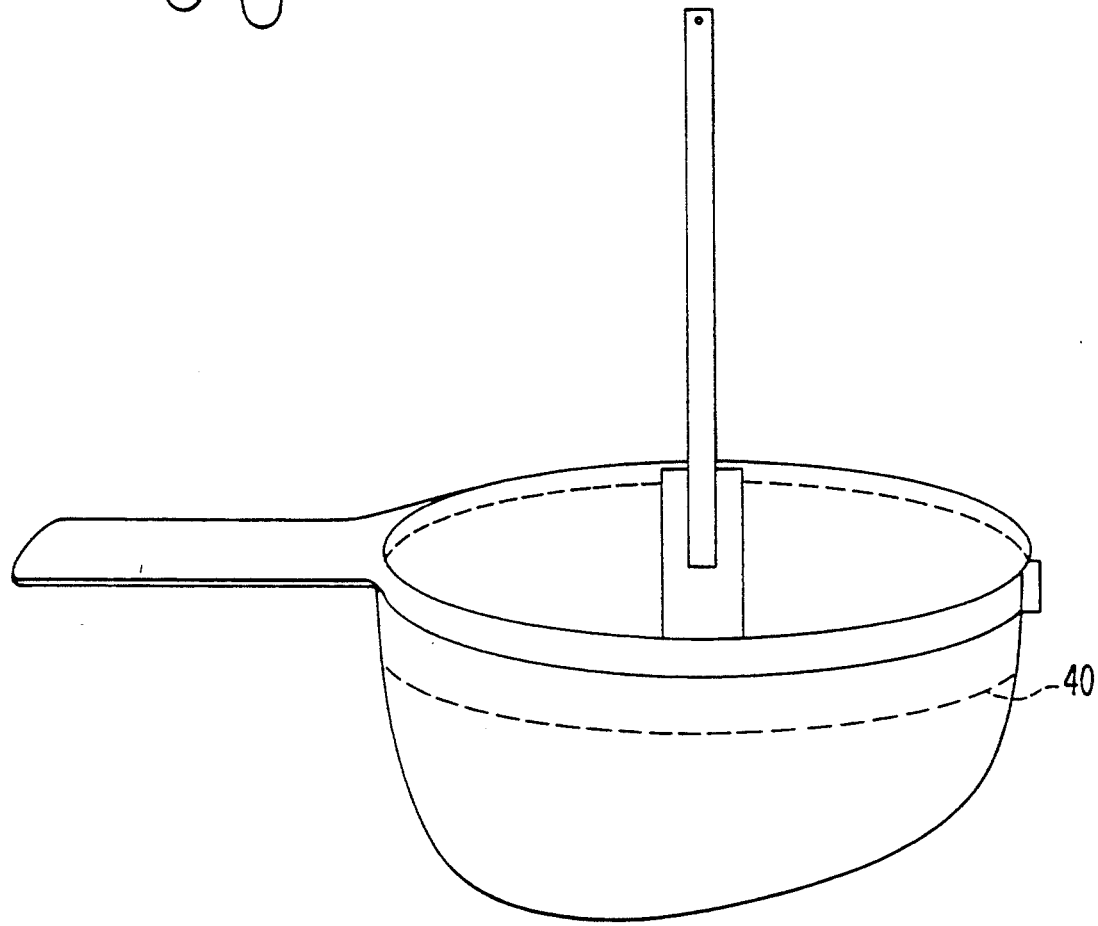
FIG. 6c is a perspective view of one of the clamping means used in the testing apparatus to test leaks in hats.

FIGS. 6a, 6b, and 6c show close-up perspectives of the clamping means 32 with the glove, sock, and hat respectively attached. Each of these clamping means comprises an inner ring 31 which fits within the inside of the article to be tested. An outer expandable ring 33 fits over the inner ring 31 and article 35 and then is locked in place with a locking means such as a clasp or nut and bolt 36. A longitudinal bar 37 fits across a diameter of the inner ring and extending perpendicularly from this bar 37 is a rod 38 having a pin hole 39 at the top such that the rod 38 and clamping means 32 are pivotly attached to the rotatable hub via a pin.

For any of the above-mentioned articles, the same procedures are used for testing. First the article is fitted within the clamping means and is filled with water to the desired level where the waterproof material ends. This area is designated by the dashed line 40 in FIGS. 6a, 6b, and 6c. The clamping means 32 with article attached and filled with water is then pivotly attached to the rotatable hub and tested. Speeds and time intervals for testing these articles are similar to those used for testing footwear articles.

Figure 7:
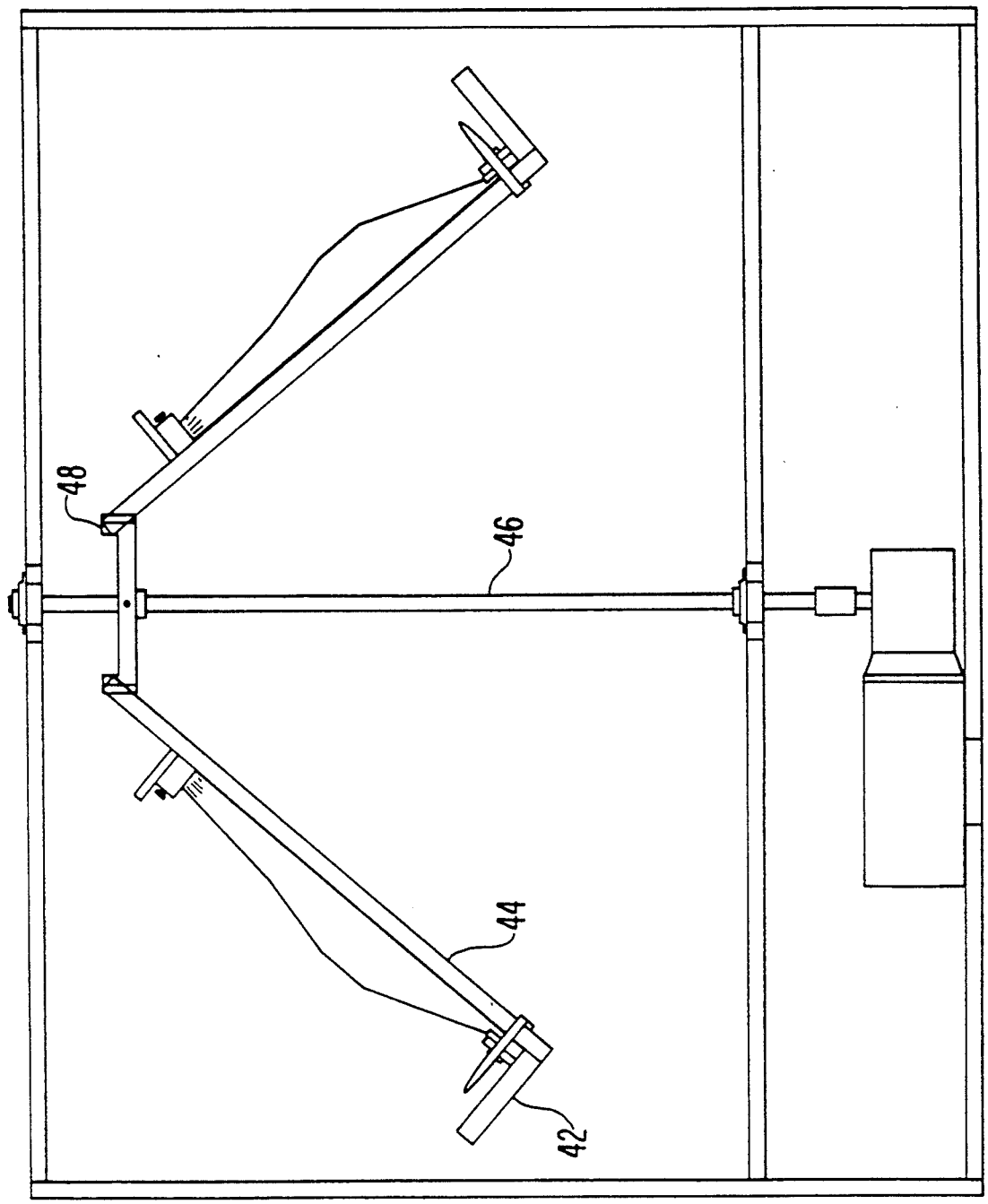
FIG. 7 is a side elevational view of the centrifuge testing apparatus for testing of trousers or waders.
Figure 7A:
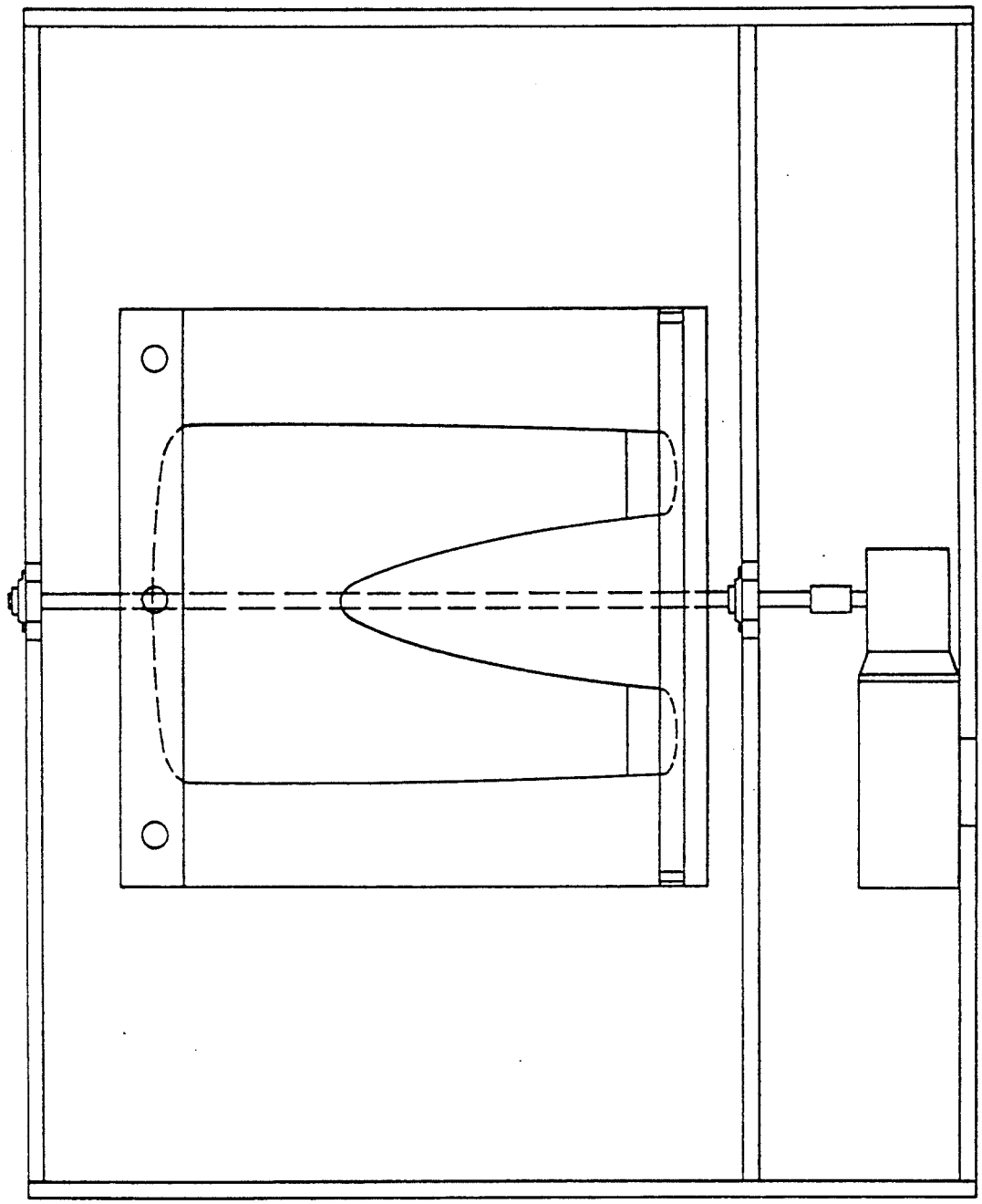
FIG. 7a is a front elevational view of the centrifuge testing apparatus for the testing of trousers or waders.
Figure 7B:
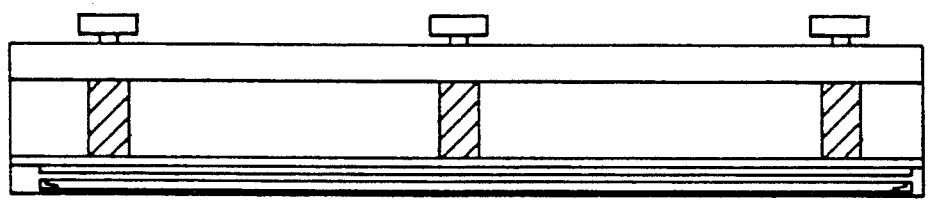
FIG. 7b is a front close-up view of the closure means and folded up trousers.
Figure 7C:
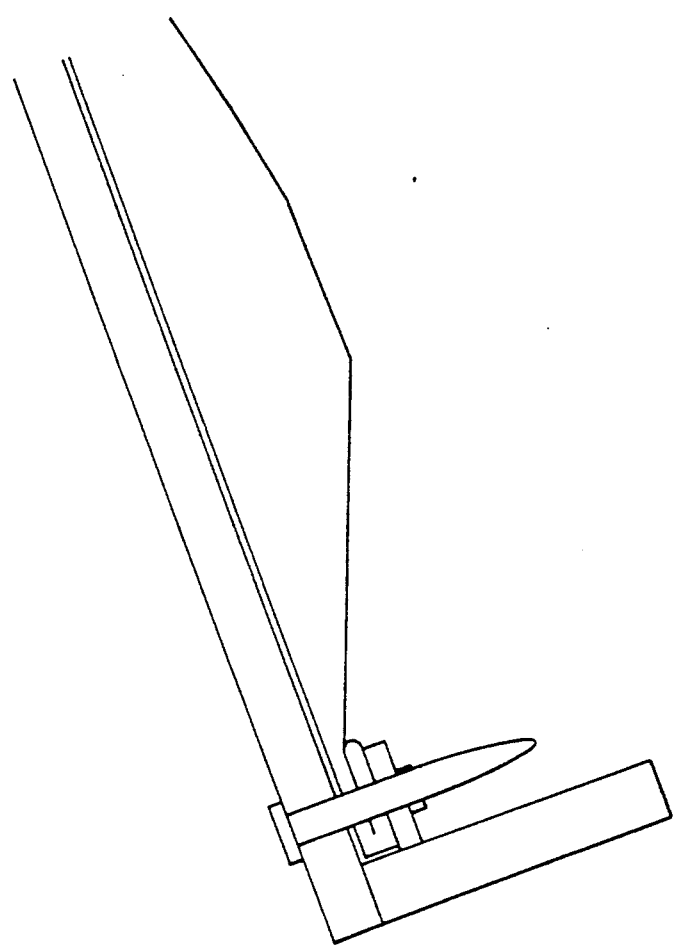
FIG. 7c is a side close-up view of the clamping means and trousers to bed/tested.

FIG. 7 shows a side elevational view of the centrifuge apparatus used to test trouser or waders. A base plate 42 with a perpendicular supporting plate 44 are used to hold the trousers in place. The perpendicular supporting plate 44 extends to the bar of the rotatable hub 46 where it is pivotly attached by a pin 48. Gripping means comprising two longitudinal bars with a nut and bolt for tightening are used at the waist area of the trousers or waders to grip the article. The grip need not be leak tight. The lower end of each trouser leg is rolled one or two times so as to be made leak tight and clamped at the bottom end by closure means such as a metal plate and vise grips. For the testing of waders having boots or socks extending from the trouser legs and attached thereto, the wader waist may be gripped similar to the trouser waist and the boots or socks section of the wader may simply be positioned on the base plate. All other steps including filling with water, spinning and observing are similar to those steps used in testing the other articles. FIG. 7a shows a front elevational view of the trousers with legs rolled to create a leak-tight environment and waist gripped so as to be supported on the testing fixture. FIG. 7b shows a side close-up view of the rolled up trouser legs clamped so as to render leakproof. The test apparatus will not demonstrate the range of testing capability as compared to a smaller test article such as shoe, glove, hat or sock. A smaller number of units can be tested at once and the speed at which the hub rotates is less than the speed that a smaller article is tested. Intervals similar to those used for testing smaller articles can be used.

EXAMPLE ONE

Figure 8:
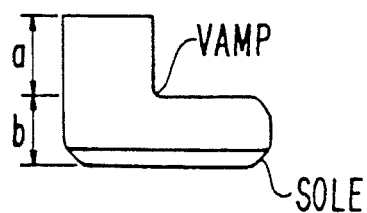
FIG. 8 is a schematic view of the footwear article referred to in Example 1.

A pair of boots were tested in the centrifuge apparatus constructed in a manner as described above. The dimensions of the boot were measured as follows and as can be seen in FIG. 8.

Height of the upper throat region = 4 in. (10.16 cm.) (designated as a in FIG. 8)

Height of the upper below the vamp = 2 in. (5.08 cm.) (designated as b in FIG. 8)

Sole area (length × width) = 12 in. × 3 in. (30.48 cm. × 7.12 cm.)

The centrifuge apparatus critical dimension was as follows: L = length of the radial arm with basket = 15.75 in. (40.0 cm.)

During testing, the angular velocity w of the centrifuge apparatus was 180 revolutions per minute, thus resulting in the angle α being calculated to be 86.04°.

A comparison of the pressures generated within the boot filled with water at various positions were calculated when the apparatus was not in operation so that α was 0° and when the apparatus was in operation as specified above. Results are shown in Table 1. FIG. 8 shows the position in the boot where the calculations were made.

TABLE 1

|  | Control α = 0° | α = 86° |
|---|---|---|
| Mass of water above vamp (a)* | 1 lb. (0.45 kg) | 1 lb. (0.45 kg) |
| Mass of water below vamp (b)* | 2.5 lb. (1.13 kg) | 2.5 lb. (1.13 kg) |
| P vamp** | 0.14 psi (9.65 × 10$^{-4}$ MPa) | 2.1 psi (1.45 × 10$^{-2}$ MPa) |
| P sole | 0.22 psi (1.52 × 10$^{-3}$ MPa) | 3.1 psi (2.14 × 10$^{-2}$ MPa)*** |

*Mass of water was measured by weight of water and boot.
**Pressures were calculated from equations described above.
***Pressure at sole is the sum of pressures calculated above and below the vamp.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

We claim:

1. A test apparatus for detecting leakage of a liquid from articles of footwear comprising:
   (a) at least one hanging basket capable of swinging outward and inward into which the footwear filled with water to be tested is placed;
   (b) a rotatable hub having a longitudinal axis around which the hanging basket is positioned;
   (c) a means for rotating the rotatable hub; and
   (d) a housing enclosure containing the rotatable hub and hanging basket.

2. A test apparatus as described in claim 1 wherein two hanging baskets are used and are positioned symmetrically about the rotatable hub.

3. A test apparatus as described in claim 1 wherein more than two hanging baskets are used and are positioned symmetrically about the rotatable hub.

4. A test apparatus as described in claim 1 wherein the hub with hanging baskets attached is in a horizontal position.

5. A test apparatus as described in claim 1 wherein pressure generated within the footwear ranges from greater than 0.22 psi ($1.52 \times 10^{-3}$ MPa) to 100 psi (0.69 MPa) when the apparatus is in operation.

6. A test apparatus as described in claim 1 wherein the means for rotating the rotatable hub comprise a drive shaft connected to a gear box and motor.

7. A test apparatus as described in claim 1 wherein the basket is constructed of:
   (a) a bottom platform plate;
   (b) a top plate parallel to the bottom platform plate to which a cross bar is attached for suspending the basket to the rotatable hub; and
   (c) a plurality of rods wherein a rod is positioned at each corner of the top and bottom plates and is perpendicular to the plates so as to connect the plates.

8. A test apparatus as described in claim 1 wherein the housing enclosure is mounted to a non-movable body.

9. A test apparatus for detecting leakage of a liquid from article of clothing comprising:
   (a) at least one clamping means capable of swinging outward and inward into which the article filled with water to be tested is clamped;
   (b) a rotatable hub having a longitudinal axis around which the clamping means is positioned;
   (c) a means for rotating the rotatable hub; and
   (d) a housing enclosure containing the rotatable hub and clamping means.

10. A test apparatus as described in claim 9 wherein two or more clamping means are used.

11. A test apparatus as described in claim 9 wherein the clamping means comprises a clasp and an inner ring and an expandable outer ring wherein the outer ring fits over the inner ring and edge of the article to be tested and wherein the clasp is used to tighten the outer ring to the article and inner ring.

12. A test apparatus as described in claim 9 wherein the means for rotating the rotatable hub comprise a drive shaft connected to a gear box and motor.

13. A test apparatus as described in claim 9 wherein the articles of clothing to be tested are selected from the group consisting of hats, gloves, and glove inserts.

14. A test apparatus for detecting leakage of a liquid from trousers and waders comprising:
   (a) a holding means comprising a base plate and a perpendicular supporting plate having gripping means to grip the trousers at a waist area and closure means at the base plate to support the trousers to bottoms and render them leakproof;
   (b) a rotatable hub having a longitudinal axis around which the holding means is positioned;
   (c) a means for rotating the rotatable hub; and
   (d) a housing enclosure containing the rotatable hub and clamping means.

* * * * *